United States Patent [19]

Laupman

[11] 3,840,800

[45] Oct. 8, 1974

[54] CURRENT CONTROL DEVICE

[75] Inventor: Robert Ronald Laupman, Wijchen, Netherlands

[73] Assignee: Novanex Automation N.V., Wijchen, Netherlands

[22] Filed: Nov. 30, 1972

[21] Appl. No.: 310,902

[30] Foreign Application Priority Data

Dec. 1, 1971 Netherlands ........................ 7116507

[52] U.S. Cl. .................. 323/19, 307/252 B, 323/24, 323/34

[51] Int. Cl. .............................................. G05f 3/04

[58] Field of Search ....... 307/252 B, 252 N; 321/16; 323/19, 22 SC, 24, 34

[56] References Cited

UNITED STATES PATENTS

| | | | |
|---|---|---|---|
| 3,337,787 | 8/1967 | Joseph | 321/16 X |
| 3,562,621 | 2/1971 | Schaefer | 323/22 SC |
| 3,590,365 | 6/1971 | Nelson | 323/24 X |
| 3,594,591 | 7/1971 | Laupman | 323/34 UX |
| 3,638,043 | 1/1972 | Laupman | 323/24 UX |
| 3,676,706 | 7/1972 | Laupman | 307/252 B |

*Primary Examiner*—A. D. Pellinen

*Attorney, Agent, or Firm*—Diller, Brown, Ramik & Wight

[57] ABSTRACT

A circuit arrangement for controlling an alternating current through a load in response to a control signal applied to its input terminals is provided with an improved organization of a firing circuit arrangement which in its simplest form comprises only two transistors. With a suitable dimensioning of the resistors and capacitors associated with two transistors, highly equivalent voltage waveforms of opposite polarity can be produced during successive half cycles in response to the control signal provided from an asymmetric signal source to fire a semi-conductor switch element through its gate control terminal in dependence on that control signal.

6 Claims, 2 Drawing Figures

CURRENT CONTROL DEVICE

The invention relates to a current control device of the type described in U.S. Pat. No. 3,638,043, Jan. 25, 1972 for controlling the current of a one-phase load or a three-phase load in dependence upon a control magnitude.

In such a current control device an electronic switching means of the type referred to as AC thyristor (triac) is connected in series with the load, which switching means is controlled through an AC diode (diac) from a firing device comprising an R-C circuit connected in parallel with the switching means, wherein the firing device comprises a rectifying circuit coupled through a capacitor to the R-C circuit, a control amplifier being connected in the output of the rectifying circuit, one input of the control amplifier for receiving an electrical signal indicative of a variable control magnitude in dependence whereon the current flowing through the load is to be controlled being connected to the tap of a voltage divider.

In accordance with these known proposals the input circuit of the control amplifier includes a control resistor for converting a variation of the respective control magnitude into a corresponding resistance variation, which resistance variation constitutes the input signal of the control amplifier. The following drawbacks are inherent in the proposals described in the above patent application: (a) one end of the control resistor is not connected to a reference potential as present, for example, on a conductor connected to an appropriate terminal of the supply network; and (b) the input signal of the control amplifier is constituted only by a resistance variation corresponding with a variation of the respective control magnitude.

As regards the first drawback it is observed that if, as in the above U.S. Pat. No. 3,638,043, the control resistor is "floating," the resultant input signal of the control amplifier is not related to the potential of one of the conductors connected to the supply network. This may entail that extraneous components introduced by the supply network through the input of the control amplifier have an undesired effect on the control operation, while moreover the operation of the firing device may become disturbed as rectifier elements of the rectifying circuit may be rendered conducting in an unwanted manner.

As regards the second drawback it is observed that in actual practice it is often considered desirable to give the respective control magnitude the form of an electrical signal adapted to be applied from an external signal source having an asymmetrical output to a control input of the control device.

It is an object of the invention to improve the proposals described in the above U.S. Pat. No. 3,638,043 by eliminating the above drawbacks.

In accordance with the invention the improvement resides in the fact that the control amplifier comprises two transistors connected in cascade, an electrode of one transistor being galvanically connected to a reference potential conductor connected both to a supply network terminal of the device and to the main electrode of the triac remote from the load; and a first branch and a second branch of the rectifying circuit, which is arranged as a bridge circuit and is connected to the coupling capacitor, each include a capacitor, the junction of the first and second branches being connected to the reference potential conductor.

Such an arrangement, wherein actually the control amplifier is galvanically connected to one of the control inputs of the triac, does not require separating transformers between the control input end of the triac and the output of the firing device, which constitutes an additional advantage as the use of such separating transformers is disadvantageous both from an economical and a structural point of view due to their relatively large size and weight, cost price and mounting possibilities.

The improvement obtained by the subject invention can also be advantageously used in the control of a three-phase load having a star point. To this end the control amplifier is connected through the reference potential conductor passing therethrough to a star point terminal of the device, the control amplifier together with the first and second bridge branches being arranged in common for three dual-diode rectifying circuits, which are each coupled through a separate coupling capacitor to the combination of R-C circuit, AC diode and AC thyristor separately provided for the respective phase.

The invention will be elucidated hereinafter by means of some embodiments and with reference to the drawing.

Figure 1:
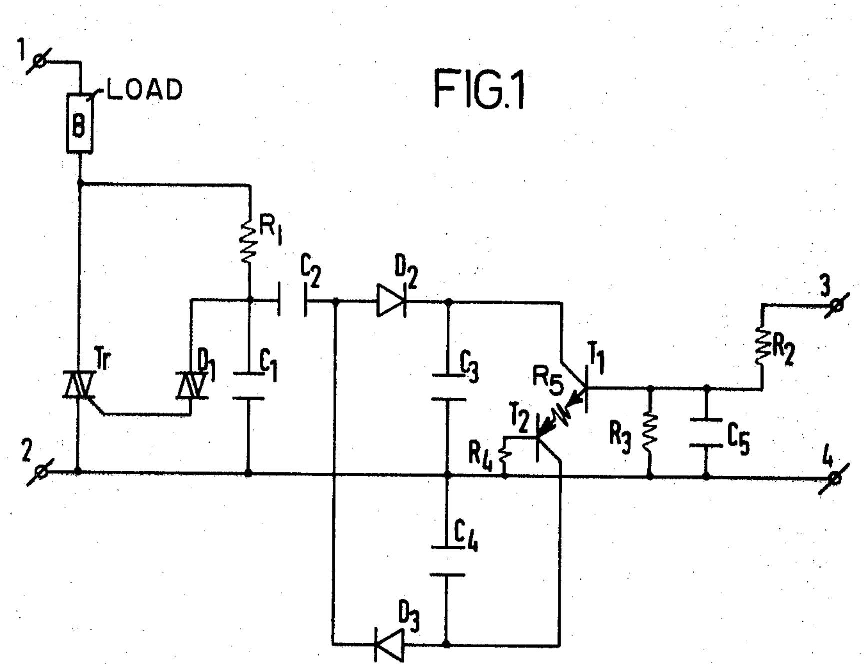
FIG. 1 is a circuit diagram illustrating one embodiment of the invention.

FIG. 1 shows a preferred embodiment of the invention, Similar to an AC control device of the type described in U.S. Pat. No. 3,638,043, this embodiment comprises an electronic switching means, such as a semiconductor AC triode *Tr* connected in series with a load B between a pair of supply network terminals 1 and 2; a semiconductor AC diode $D_1$; an R-C circuit formed by a resistor $R_1$ and a capacitor $C_1$ connected in series therewith; and a capacitor $C_2$ wherethrough the AC diode $D_1$ is coupled from the junction of the resistor $R_1$ and the capacitor $C_1$ to a firing device adapted to cause the times of occurence of the firing pulses produced through the diode $D_1$ during each half cycle of supply network voltage to correspond to a control magnitude.

This capacitor $C_2$ is essential in this connection, as by this capacitor it is achieved that the control range can extend to relatively small conduction angles and inequalities, if any, in the conduction angles of successive half cycles are compensated. Contrary to the proposals described in the above U.S. Pat. No. 3,638,043, in the embodiment shown in FIG. 1 the firing device, and particularly the control amplifier that is a part thereof, is arranged such that this amplifier comprises a common input and output conductor 2,4, which is connectable to an appropriate reference potential as present, for example, on the supply network terminal 2, and two output conductors, which are "electrically symmetrical" relative to the common input and output conductor.

To this end the control amplifier includes two transistors $T_1$ and $T_2$ of opposite conductivity type, which have their emitters interconnected. These two transistors have their respective collectors connected to a rectifying circuit formed by two diodes $D_2$ and $D_3$ and two capacitors $C_3$ and $C_4$. Analogous to this control amplifier, also this rectifying circuit comprises two outputs, viz. the junction of the diode $D_2$ and the capacitor $C_3$ and the junction of the diode $D_3$ and the capacitor $C_4$, which are "electrically symmetrical" relative to a common input and output conductor. An electrical input signal indicative of the respective control magnitude can be applied from a signal source having an electrically asymmetrical output to the terminals 3 and 4, as a result whereof, partly due to the "electrically symmetrical" configuration, a control current through the base-emitter circuit of the transistor $T_1$ and the emitter-base circuit of the transistor $T_2$ can fully flow off through an input resistor $R_2$ to the common "reference potential conductor" between terminals 2 and 4. Inherent in the symmetrical configuration is that the collector current $I_{c1}$ of the transistor $T_1$ is substantially equal to the collector current $I_{c2}$ of the transistor $T_2$. The magnitude of these collector currents depends upon the magnitude of the electrical input signal applied to terminals 3 and 4. As a result thereof the charging and discharging respectively, of the capacitors $C_3$ and $C_4$ can be controlled such that the firing moments of the switching means Tr can be shifted in dependence upon th control magnitude, thereby ensuring equality of the conduction angles in successive half cycles (symmetrical phase angles) throughout the entire control range. It is observed in this connection that in the absence of a control signal at the input of the control amplifier this amplifier does not derive current from the capacitors $C_3$ or $C_4$, which implies a relatively early firing of the triac in the respective half cycle. By means of a capacitor $C_5$ connected between the base and the common conductor extraneous signals introduced into the input signal can be diverted to the common conductor, so that such extraneous signals do not affect the control operation. On the other hand, by an appropriate choice of the capacitance of the capacitor $C_5$ it is possible to introduce a certain delay between the input signal and the control operation included thereby.

It is further observed that it is also possible to directly apply the control signal (without intervention of the input resistor $R_2$) to the base of the transistor $T_1$, this control signal being produced by a voltage supply having low internal resistance. In this arrangement it is recommendable to connect an auxiliary resistor R5 between the emitters of the transistors ($T_1$ and $T_2$). If this auxiliary resistor is properly dimensioned, the circuit arrangement appears to be substabtially independent of manufacturing deviations in the parameters such as current gain factors of the transistors $T_1$ and $T_2$ used.

The subject invention can be used also if the input signal of the transistors $T_1$ and $T_2$ is formed by a variation of a resistor connected between the base of the transistor $T_1$ and the common conductor 2-4. This resistor may be either a control resistor (potentiometer) or a temperature-responsive resistor (e.g., NTC-resistor). In both cases this resistor should be fed from a direct current supply. If this direct current is collected, for example, from the junction of the rectifier diode $D_2$ and the capacitor $C_3$ and is applied to the resistor in question through a high-ohmic resistor, the resultant asymmetry should be eliminated by connecting a compensating resistor between the common conductor 2-4 and the junction of the other rectifier diode $D_3$ and the capacitor $C_4$.

The control amplifier described above may be replaced by other embodiments without exceeding the scope of the subject application.

In order to reduce radiation effects the above reference potential conductor may be advantageously connected to ground.

Figure 2:
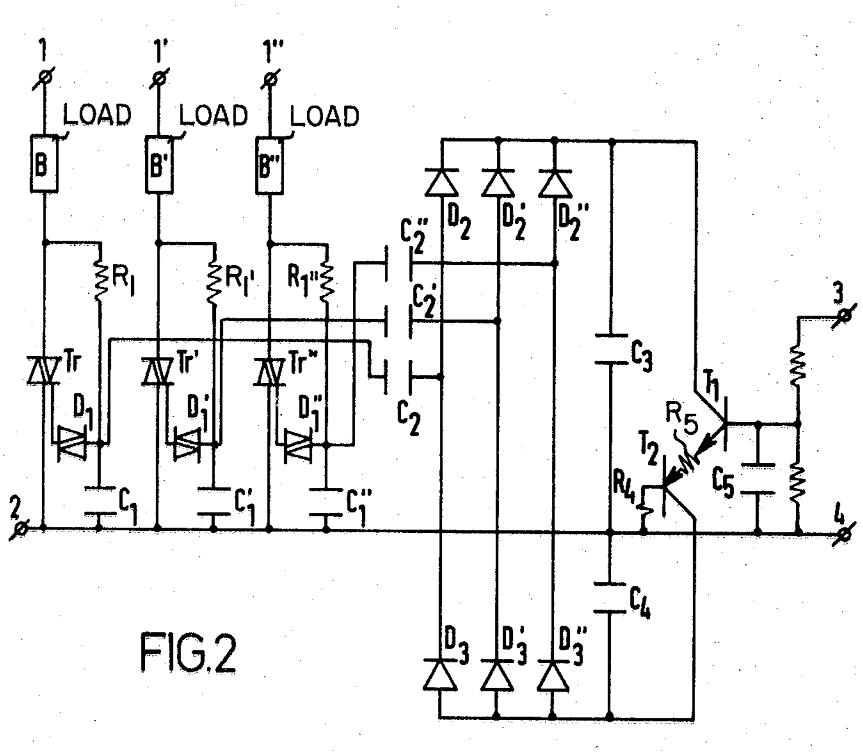
FIG. 2 is another embodiment of the invention.

FIG. 2 shows an embodiment of the invention wherein the load is connected in a three-phase supply network having a star point. The components corresponding to those of the embodiment shown in FIG. 1 are provided in FIG. 2 with corresponding accents for each phase. The terminal 2 is connected to the star point of the three-phase supply network.

The variants of the control amplifier indicated above can also be used in the embodiment arranged for a three-phase supply network. The embodiment soown in FIG. 2 has the advantage that a coupling between the respective switching means T*r*, T*r*′ and T*r*″ and the common control amplifier can be formed with simple means and without the necessity to use separating transformers.

Finally it is observed that inequalities, if any, in the network components used can be eliminated by connecting adjustable compensating resistors in parallel with the capacitors $C_1$, $C_1'$ and $C_1''$.

I claim

1. In combination with an A.C. circuit having first and second supply terminals, an A.C. load and a bilateral switching diode connected in series between said supply terminals, said switching diode having first and second electrodes connected respectively to said first supply terminal and to said load and having a control electrode to control the current through said load, a series RC circuit having a capacitive portion and a resistive portion respectively connected to said first and second electrodes of the bilateral switching diode, and a bilateral diode connected between said control electrode and the junction between the protions of said series RC circuit whereby to control the switching time of said switching diode during successive half cycles of the supply in accord with voltage variations at said junction; a control circuit for modifying said voltage variations, said control circuit comprising:

a pair of rectifying circuits connected in parallel and each including a diode and a capacitor in series in which the diodes of the two rectifying circuits are oppositely poled;

an auxiliary capacitor;

said rectifying circuits and said auxiliary capacitor being connected in series to each other with one terminal of the capacitor of each rectifying circuit connected to said first supply terminal and one terminal of said auxiliary capacitor connected to said junction of the series RC circuit; and control input means connected to said rectifying circuits for controlling said voltage variations at said junction of the series RC circuit and assuring that essentially similar voltage waveforms of opposite polarity appear at such juction during successive half cycles of the A.C. supply, said control input means comprising a pair of transistors of opposite conductivity type having their emitter-collector paths connected between the junctions of the capacitors and diodes of said rectifying circuits, one of said transistors having its base electrode connected to said first supply terminal and said other transistor having its base electrode adapted for connection to a control signal input.

2. A current control device in accordance with claim 1, characterized in that a capacitor is connected between the base of said one transistor and said reference potential conductor.

3. A current control device in accordance with claim 1, characterized in that said two transistors have their emitters interconnected through an auxiliary resistor, said resistor being dimensioned such that differences, if any, in the operational parameters of said transistors are compensated.

4. A current control device in accordance with claim 1, characterized in that said two transistors have their emitters interconnected through an auxiliary resistor, said resistor being dimensioned such that differences, if any, in the operational parameters of said transistors are compensated.

5. In the combination as defined in claim 1 wherein the A.C. circuit is of the three phase type in which said first supply terminal constitutes the common star point.

6. In the combination as defined in claim 5 wherein a second A.C. load and a second bilateral switching diode are connected in series between a further supply terminal and said first supply terminal with said second switching diode having one electrode connected with said first supply terminal, a second electrode connected to said second load and having a control electrode; a second series RC circuit having a capacitive portion and a resistive portion connected respectively to said first supply terminal and to said second electrode of said second switching diode; a second bilateral diode connected between said control electrode of said second switching diode and the junction between said portions of said second series RC circuit; a second auxiliary capacitor; and a second pair of rectifying circuits connected in parallel and each including a further diode in which such further diodes are oppositely poled and connected in series with said second auxiliary capacitor to said junction of said second series RC circuit, said further diodes being connected respectively to the capacitors of the first mentioned rectifying circuits.

* * * * *